T. J. WINSHIP.
Apparatus for Molding Cigars.
No. 137,749. Patented April 8, 1873.
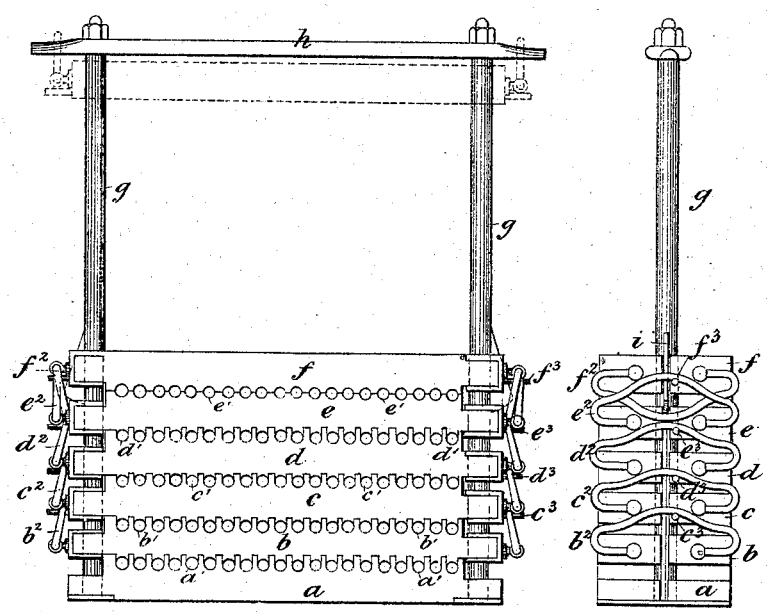
Witnesses:
Thos. J. Winship
Inventor:

UNITED STATES PATENT OFFICE.

THOMAS J. WINSHIP, OF MONTREAL, CANADA.

IMPROVEMENT IN APPARATUS FOR MOLDING CIGARS.

Specification forming part of Letters Patent No. 137,749, dated April 8, 1873; application filed February 24, 1873.

*To all whom it may concern:*

Be it known that I, THOMAS J. WINSHIP, of the city of Montreal, in the district of Montreal, in the Province of Quebec, Canada, have invented new and useful Improvements on Apparatus for Manufacturing Cigars; and I do hereby declare that the following is a full, clear, and exact description of the same.

This invention consists in the arrangement of the press used for pressing the "bunches" forming the inner body of cigars, which are afterward covered by any suitable wrapper.

It may be here well to explain that I am aware that presses have been formed for this purpose by a number of "leaves," each having a number of recesses so arranged that they correspond and make up a series of molds. In all these it requires two leaves to make one series.

It is practically very difficult, especially in a large factory, to keep the corresponding leaves together, and when the necessary pressure is put on, and some of the leaves do not exactly match, the result is that not only are the bunches in process of manufacture spoiled, but the edges of the top leaves are broken off, and the molds thereby rendered useless. Again, when the pressure is taken off, and it is desired to remove the leaves, it is found that they are held so tightly together by the bunches that it is necessary to wedge them apart. To obviate these defects, and to produce a press better adapted for its purpose and the general requirements of the business is the object of my invention, shown in the annexed drawing, in which similar letters of reference indicate like parts.

Figure 1 shows a side elevation of my press. Fig. 2, an end elevation of the same.

Letter $a$ is the bottom leaf, in which are formed any required number of lower halves of the mold $a^1$ for cigar-bunches. $b$ is a leaf, in the lower side of which are formed the upper halves of the mold $a^1$, and on the upper side the lower halves of the mold $b^1$, the leaves $c$, $d$, and $e$ having, respectively, on their lower sides, the upper halves of the molds $b^1$, $c^1$, and $d^1$, and on their upper sides the lower halves of the molds $c^1$, $d^1$, and $e^1$.

$f$ is the top leaf, in the under side of which are formed the top halves of the molds $e^1$.

It will clearly be understood that, although but four leaves besides the top and bottom ones are shown in the drawing, I do not confine myself to this precise number, as any number of leaves, similar to those lettered $b$, $c$, $d$, and $e$, may be employed.

To each of the leaves, with the exception of the bottom one, is attached, at either end, a handle, preferably of some such configuration as that shown in the drawing, and lettered, respectively, $b^2$, $c^2$, $d^2$, $e^2$, and $f^2$. From the ends of the leaves $c$, $d$, $e$, and $f$—i. e., all with the exception of the bottom leaf and that next above it—project, also, pins marked $c^3$, $d^3$, $e^3$, and $f^3$. Into the bottom leaf are set, where shown, two vertical rods, $g$, of the height required by the number of leaves in the press, serving as guides to the leaves, and secured at the top by nuts, or in any other convenient way, to a horizontal bar, $h$, the ends of which project considerably beyond the rods. These guides take the place of the wooden pins at present used to keep the leaves in their proper relative position to each other, and which, from their liability to breakage, and consequent necessity for renewal, are a great source of trouble and annoyance. $i$ are flanges projecting from the rods $h$, as shown in the drawing, slots clear of the pins being formed in each of the leaves to allow them to pass through.

The operation of my invention is as follows: The press being in the position shown in the drawing—i. e., that which it assumes when the operation of pressing the cigar-bunches is just finished—the top leaf $f$ is first raised by the handles $f^2$ and hung on the ends of the bar $h$, as shown by the dotted lines in Fig. 1, the leaf $e$ being raised in the same way and hung on the pins $f^3$ projecting from $f$, the same operation being performed with each leaf until all except the bottom one, $a$, are raised, the cigar-bunches being removed as each set of molds is laid bare, and the press is then ready to be filled. As soon as the molds $a^1$ are filled, the leaf $b$ is let down, the rods $g$ serving as guides to insure the exact fit of the upper into the lower halves of the molds. The molds $b^1$ are then filled, and the same operations are repeated until the top leaf $f$ is in place. The handles $f^2$ are then dropped down so as to catch the under side of the flanges $i$ and lock the whole press.

What I claim is as follows:

The combination of the leaves, provided with handles and pins, as described, with guides $g$ and cross-bar $h$, all constructed and arranged to operate as described.

Montreal, 13th day of Februry, A. D. 1873.

THOS. J. WINSHIP.

Witnesses:
C. G. C. SIMPSON,
R. A. KELLOND.